June 20, 1933.                L. P. KONGSTED                1,914,809
                              SPARK PLUG TESTER
                              Filed June 9, 1932
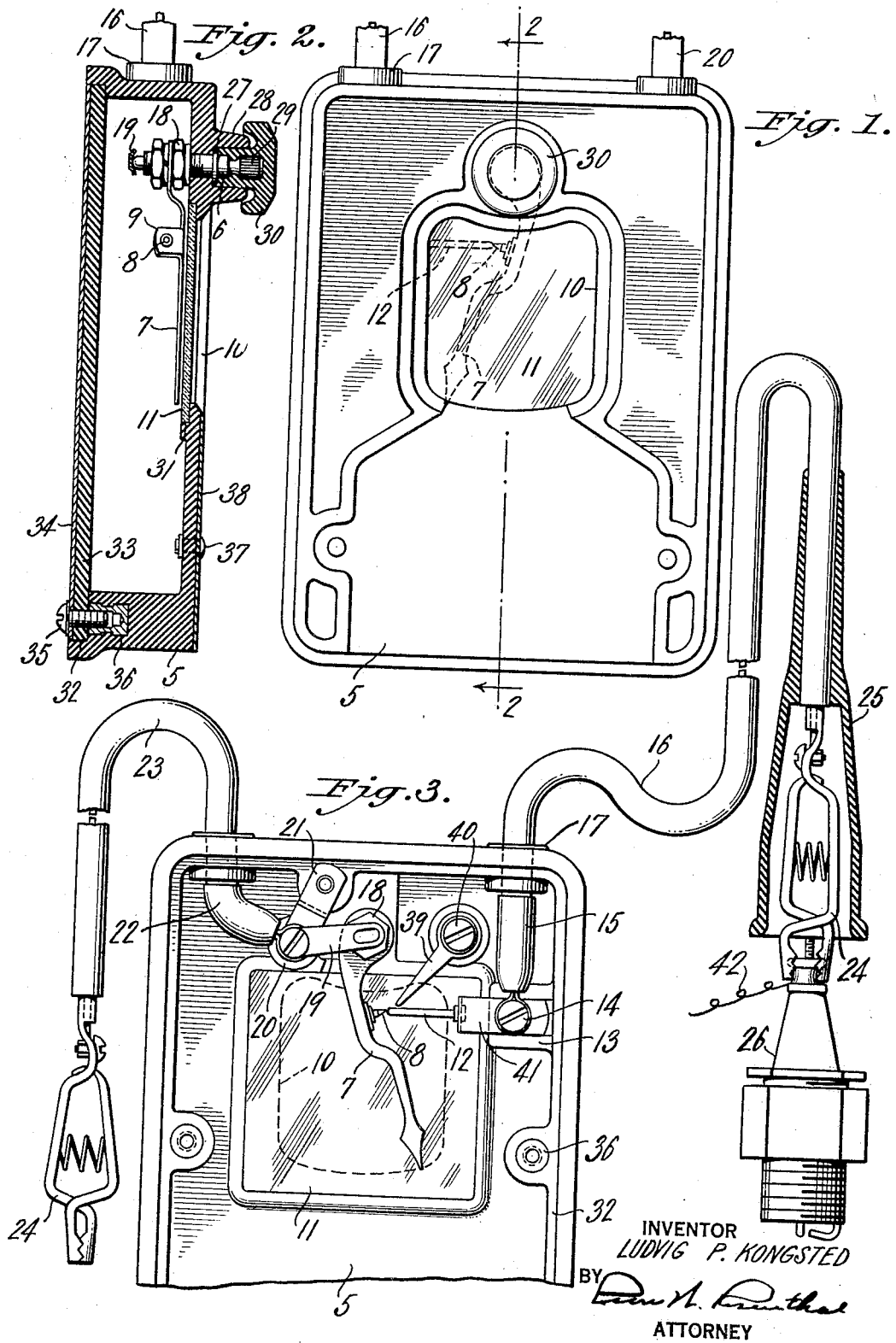
INVENTOR
LUDVIG P. KONGSTED
BY
ATTORNEY Patented June 20, 1933

1,914,809

UNITED STATES PATENT OFFICE

LUDVIG P. KONGSTED, OF LONGMEADOW, MASSACHUSETTS, ASSIGNOR TO UNITED AMERICAN BOSCH CORPORATION, OF SPRINGFIELD, MASSACHUSETTS, A CORPORATION OF NEW YORK

SPARK PLUG TESTER

Application filed June 9, 1932. Serial No. 616,222.

My invention relates to improvements in testers; and particularly to a testing device for the spark-plugs of an internal combustion engine.

An object of the invention is to provide a tester adapted to be utilized in connection with the ignition circuits of internal combustion engines; so that the condition and efficiency of the spark plugs connected to said circuits can be readily determined.

A further object of this invention is to provide a spark plug tester which can very quickly be connected for use; which is easy to operate and which is of simple construction and can be manufactured at low cost.

On the drawing, which illustrates a preferred form of the invention, the construction of the device is shown by way of example; and I reserve the right to make changes in the shape, size and arrangement of the parts to the full extent consistent with the broad and general meanings of the terms of the appended claims.

On said drawing;

Fig. 1 is a front view of a tester according to this invention;

Fig. 2 is a longitudinal section on the line 2—2 of Fig. 1; and

Fig. 3 shows a rear view of a part of the tester, including the connections to a circuit in which the spark plugs are to be examined.

The same numerals identify the same parts throughout.

The tester comprises a molded casing 5 of suitable insulating material in the front of which, near one end, is mounted a short shaft 6 carrying inside of the casing a rigid arm or index pointer 7 carrying an element 8. This pointer 7 is mounted to be moved across a window opening 10, which is closed by a pane of glass or like transparent material 11. The element 8 is mounted on a projection 9 of the arm 7; it serves as an electrode and is arranged to cooperate with an electrode 12 made fast to a projection 13 inside of the casing by a screw or like fastening device 14. By means of the screw 14 a metallic socket 15 is also anchored to the projection 13; and this socket holds the inner end of the conductor of a cable 16, which enters the casing 5 through a bushing 17. When the shaft 6 is turned, it moves the pointer 7 so as to separate the electrode 8 from the electrode 12 by a spark gap of greater or less length.

The shaft 6 is mounted to turn in a bearing in the front of the casing above the window 10 and it is threaded on its inner end to receive the nuts 18 between which the index pointer or arm 7 is clamped. The inner extremity of this shaft makes contact with a resilient leaf spring 19 which presses against the shaft at one end and is anchored at the opposite end by screw 14 engaging a threaded aperture in a projection 20 inside of the casing 5. At 21 is a thin metallic strip which is connected by means of a screw to spring 19 at one end and grounded to the cover plate at the other. This screw also secures a curved socket 22 which, like socket 15, receives the end of a cable 23 to connect said cable to the spring element 19 and pointer 7. The cable 23 also passes through a bushing and carries on its outer end a clip 24 to enable connection to be readily made with any suitable ground on the internal combustion engine block or the framework of a vehicle carrying same to be propelled thereby.

The purpose of the grounding strip is to bring the metal cover plate, which is in contact with operator, and electrode on index pointer to same common ground potential so as to eliminate the variable effect of body capacity on the behaviour of the spark gap.

In practice the end of the cable 16 also has a clip 24, enveloped by a sleeve 25 of insulation. This clip is caused to engage the outer end of the stem or central electrode of the spark plug 26 to be tested without disconnecting the plug. The tester is merely connected in parallel with the plug; and at first the electrodes 8 and 12 are moved into contact with each other. Thus one of the cylinders of the engine will no longer fire, but the other cylinders will remain in operation and the performance of each plug in turn can thus be watched. The shaft 6 is now turned to carry the pointer 7 away from the electrode 12 and thus establish a spark gap between this electrode and the electrode 8. The length of the spark passing thereover indicates the condition of the plug.

The shaft 6 has a collar 27 near its outer end abutting against a shoulder at the bottom of a boss 28 on the exterior of the casing 5; and the outer end of the shaft is fluted at 29, so that an operating knob 30 can be molded thereon. The turning of the knob of course moves the arm or pointer 7 as far as required, say to the right of Fig. 1; and in practice this knob is always turned to see what is the greatest length of the gap between the electrodes 8 and 12 over which a discharge can be obtained in multiple with a plug 26.

The window pane 11 is secured in any suitable manner against an inside shoulder 31 surrounding the opening 10; and at the rear the sides of the casing have another inside shoulder 32 to receive a closure 33, likewise of insulation. This closure may be faced on its outside by means of a metallic plate 34 which may bear directions indicating how the tester is to be used. The closure 33 and plate 34 are secured by screws 35 engaging threaded sockets 36 embedded in the sides of the casing 5.

The front of the casing 5 may also receive a plate of suitable material 37 held fast by rivets 38 and the edge of this plate near the opening 10 will bear graduations to make the plate serve as a dial.

The aperture in the casing for the shaft 6 is of course smooth and this shaft is threaded only for the purpose of receiving the binding nuts 18. These nuts and the collar 27 prevent axial movement of the shaft, and washers between the nuts and the inside of the casing 5 may be added if desired.

The tester thus constitutes a very useful appliance which can be easily handled by a garage man or mechanic when one desires to find out whether or not the spark plugs of an ignition circuit are in good operative condition.

A tickler or ionizing electrode 39 can be secured by a suitable screw to a projection 40 in the casing 5. This electrode is secured in position to hold its point separated from the electrode 12 the required distance. This electrode is insulatably supported in the casing 5 and it facilitates getting a spark between the electrodes 7 and 8. It may be omitted if not desired. The electrode 12 can be supported on a bracket or angle piece 41, secured to the projection 13; and attached to this angle piece by riveting over one end thereof. The usual high tension lead for the plug is indicated at 42 and is not disconnected when the tester is to be employed.

The presence of the ionizing electrode 39 insures more definite readings which may be duplicated under the same conditions of test.

The tester is intended for use as an analyzer of spark plug performance in internal combustion engines where battery ignition or magnetos are used.

The function of this tester is to measure in arbitrary units the peak voltage which exists across a spark plug during conditions of motor acceleration under wide open throttle when the cylinder is under greatest compression. The higher the compression of the motor the higher the voltage will be across the plug for a given gap setting, because it is more difficult to fire through a highly compressed gas mixture than one at a lower compression.

In a similar manner the larger the spark plug gap, the higher the voltage across the plug will have to be in order to cause the spark to jump across the larger gap. Conversely, if a plug gap is very small or entirely short circuited by carbon, the voltage across the plug drops to a very low value or becomes zero entirely. All of these conditions will be reflected by the readings obtained with the tester.

The scale on the plate 37 is divided into arbitrary units which bear a certain relationship to the length of gap in the tester and the voltage necessary to fire this gap. There is no need, however, for the operator knowing this relationship, as the readings obtained on the scale are only used for comparative purposes.

As the compression ratio, fuel mixture, spark gap setting in plug, etc., will vary widely between different makes of motors, and even between motors of the same make and age, a calibration of the tester in connection with a new plug in each motor is necessary for comparative purposes. This calibration can very easily be made as follows.

The tester is most conveniently used when the operator is working from the carburetor side of the motor. The test should be made only when the engine and spark plugs are normally hot. If the engine has been shut down, even for a short time, run for a few minutes to warm up. If the engine is badly overheated, allow it to cool for a few minutes.

The operator first moves the pointer of the tester to extreme left, and then connects the cable with the rubber insulated slip to the terminal of the first plug, leaving the regular spark plug cables in place. If suppressors are used in connection with motor car radio, he connects the insulated clip to the spark plug terminal end of the suppressor, if possible—if not, to the other end of the suppressor, as readings are not greatly affected, unless the supressor is defective. In this case it may be determined by obtaining readings both above and below the supressor resistance unit.

In order to get full compression in the cylinders, the operator starts with motor idling and snaps carburetor throttle wide open, holding throttle in this position until engine accelerates to speed corresponding to approximately 30 miles per hour; he then releases throttle to prevent the engine from racing. If the spark does not jump the gap in the tester, he moves the pointer slightly to the right, and starting with the engine idling again, accelerates as before. He continues this procedure until the spark just begins to jump the gap in the tester, and observes the reading on the graduated scale and records it. Each plug is tested in this manner and the readings in each case are recorded.

A comparative test with a new spark plug can also be made to obtain a standard reading for a good plug in the motor.

The operator first inserts in the cylinder showing a high reading on the tester, a new plug of the proper type and gap setting as recommended by the spark plug chart. The engine is run a few minutes to warm up this plug and then this plug is tested as before. He can now compare the readings of the plugs tested with the standard established by the new plug. Those plugs for which the readings are within a certain variation from this standard reading, may be considerered satisfactory. Plugs with readings too low in value have either a gap setting that is too small, a defective insulator, or are operating under conditions of abnormally low compression. Plugs with readings too far above this standard reading have a gap setting that is too large. The insulator in this case is in good electrical condition.

The test thus definitely locates the spark plugs which are electrically defective. Certain mechanical defects, such as chipped, cracked or broken insulator, lack of uniform gap setting, badly burned electrodes, and unusual deposits of carbon, can be determined only by visual inspection of the plugs after removal from the engine. For a complete inspection of all the plugs, one must remove them from the engine, keeping them in their correct order, and measure their gap settings and record same for purpose of comparing with the gap setting recommended by the manufacturer. The condition of the insulator, too, must be observed.

A gap setting that is too small, as indicated by the tester, will cause hard starting and uneven operation at low speeds. Gaps that are too small also produce an unfavorable effect upon the acceleration and power of the motor. The gaps in all plugs should be properly set before putting plugs back in the motor.

A gap setting that is larger than that recommended for the motor, causes missing at high speeds, puts undue strain on ignition coil and cables and may cause road failure. In very high compression motors with abnormally wide gap settings, flash-overs may occur, causing hard starting and missing on acceleration or on heavy pulls. Gaps should be reset in accordance with recommendation of manufacturer. If the electrodes are badly burned, one replaces the plugs with new ones.

The condition of the insulator of the plug has a very definite effect upon the performance of the motor. A heavy coating of wet black carbon indicates a fouled plug. This carbon deposit may be due to too small gap setting, oil pumping, or too rich mixture. If the tester reading was zero or very low for such a plug, a new one should be substituted.

A heavy sooty deposit of dry carbon, with low reading on the tester, indicates a rich mixture, if the gap is properly set. This condition may be remedied with the proper adjustment of the carburetor.

If the insulator is free of carbon and bluish gray in color, the plug is operating at too high a temperature and causing pre-ignition or pinging. This condition can only be remedied by the application of a new plug of the proper type and gap setting, as recommended by the spark plug chart.

The visual examination of the plugs may reveal other indications; according to which the tester proceeds as may be required by the special circumstances of each case.

The spark plug tester is superior to particularly cold air compression testers and spark plug testers in which Neon lights are used as indicators, because of the fact that the tester affords a comparatively wide range of indications each of which may be of particular significance.

As a means of quickly locating spark plugs completely or partially fouled due to carbon or leaky insulation, or plugs which have abnormally large gaps due to natural or abnormal wear, or broken off electrodes, the spark plug tester should be of definite value to any service station.

It is used during actual operation of the automobile engine, and, therefore, tests plugs while they are being subjected to normal heat and explosion pressures. The readings obtained at any one trail are quite uniform and consistent, and will show up differences where plugs are fouled or have excessively large gaps. The chief value of the tester lies in its ability to quickly locate a plug which has given trouble.

This tester is to be used for the purpose of quickly locating spark plugs which are defective in their performance due to improper gap setting, to an excessive accumulation of carbon, or to corroded or bady burned electrodes. The test is performed on a motor at normal operating temperatures. By starting at idling speed each time and accelerating the motor, advantage is taken of the requirements of peak voltage at the time of maximum compression which takes place during rapid acceleration under wide open throttle. At the same time, advantage is also taken of the heat conditions which exist in the motor during the period of acceleration.

If a healthy spark occurs in the tester each time and the readings for all plugs are fairly uniform, the indications are that the condition of the plugs is about the same in each cylinder. Remove one of the plugs for visual inspection.

An abnormally low reading or zero reading indicates that the plug is badly carbonized or that the insulator is cracked, that the gap is entirely closed or that the plug is completely shorted due to erosive carbon. Where such readings occur, such plugs should be examined first for their condition and if new plugs are required, those of the proper type, heat rating and gap setting for the motor in question, should be selected to replace the old ones.

A plug with a much higher reading than others indicates a wide gap, either improperly set or due to the electrodes being badly burned. Such a plug should be inspected and if found to be badly burned, should be replaced with a plug of the proper type, heat rating and gap setting.

As a merchandising device the tester has considerable value because a prospective customer is more easily induced to have his plugs tested when he is told that they do not have to be removed and that they will be tested quickly under actual operating conditions while they are still in the engine.

Having described my invention, what I claim is:

1. A tester comprising a casing of insulation, a fixed electrode therein, a conducting cable connected to said electrode and extending to the outside of the casing, an arm pivotted in the casing, said arm having a projection at one side bearing an electrode to cooperate with said fixed electrode and form a spark gap, means to rotate said arm to adjust the length of the gap and a second cable connected to said arm and extending to the outside of the casing, and an ionizing electrode adjacent both of the first-named electrodes.

2. A tester comprising an insulating casing, a fixed electrode therein, a socket attached to the electrode, a cable connected to said socket and extending to the outside of the casing, a short shaft rotatable in the wall thereof, the casing having an exterior boss surrounding the outer end of said shaft, an operating knob on said end, an arm attached to the inner end of the shaft and having a lateral projection bearing an electrode to cooperate with said fixed electrode, an ionizing electrode carried by the casing adjacent the first-named electrodes, a spring secured to the inside of the casing and making contact with the inner extremity of said shaft, a metallic socket attached to said spring and a second cable secured in said socket and extending through to the outside of the casing.

In testimony whereof I affix my signature.

LUDVIG P. KONGSTED.